(12) United States Patent
Luckau

(10) Patent No.: US 10,513,360 B1
(45) Date of Patent: *Dec. 24, 2019

(54) LEAF BAG COMPRESSING ADAPTER DEVICE AND METHOD OF USING

(71) Applicant: Dennis Luckau, Fort Collins, CO (US)

(72) Inventor: Dennis Luckau, Fort Collins, CO (US)

( * ) Notice: Subject to any disclaimer, the term of this patent is extended or adjusted under 35 U.S.C. 154(b) by 286 days.

This patent is subject to a terminal disclaimer.

(21) Appl. No.: 15/608,854

(22) Filed: May 30, 2017

Related U.S. Application Data

(63) Continuation of application No. 14/221,110, filed on Mar. 20, 2014, now Pat. No. 9,688,429.

(51) Int. Cl.
*B65B 31/04* (2006.01)
*B65F 1/14* (2006.01)
(Continued)

(52) U.S. Cl.
CPC ............ *B65B 31/042* (2013.01); *A47L 7/009* (2013.01); *A47L 7/0085* (2013.01); *B65F 1/1405* (2013.01); *A01D 43/0633* (2013.01); *A01D 43/0636* (2013.01); *A01G 20/43* (2018.02); *A01G 20/47* (2018.02); *B65B 1/26* (2013.01); *B65B 61/24* (2013.01); *B65F 2210/188* (2013.01)

(58) Field of Classification Search
CPC .... B65F 1/1405; B65F 2210/188; B65B 1/26; B65B 31/04; B65B 31/042; B65B 31/046; B65B 31/048; B65B 31/06; B65B 61/24; A01G 1/125; A01G 20/43; A01G 20/47; A01D 43/0633; A01D 43/0636; A47L 7/0052; A47L 7/0085; A47L 7/009; A47L 9/248

USPC ......... 53/434, 436, 512, 527; 100/90; 141/7, 141/65
See application file for complete search history.

(56) References Cited

U.S. PATENT DOCUMENTS

| | | |
|---|---|---|
| 3,968,620 A | 7/1976 | Keltner |
| 4,190,924 A | 3/1980 | Nicholson |
| (Continued) | | |

FOREIGN PATENT DOCUMENTS

| | | |
|---|---|---|
| DE | 2720807 A1 | 11/1978 |
| DE | 102006010452 A1 | 9/2007 |
| (Continued) | | |

OTHER PUBLICATIONS

EPO machine translation of DE 102006010452, retrieved Aug. 19, 2016, 6 pages.
(Continued)

*Primary Examiner* — Stephen F. Gerrity
(74) *Attorney, Agent, or Firm* — James R. Young; Cochran Freund & Young LLC

(57) ABSTRACT

An adapter device for suctioning air out of plastic bags of a type typically used for containing fallen leaves and other yard waste for disposal comprises a screen that surrounds a space that is connectable in fluid flow relation with the suction end of the vacuum hose, a shield positioned around the screen that is capable of preventing a plastic bag from being sucked by vacuum to the screen. The mouth of the shield is sized for blocking leaves or other yard waste matted in the bag from being sucked to the screen while allowing air in the bag to flow to the screen.

10 Claims, 10 Drawing Sheets

(51) Int. Cl.
*A47L 7/00* (2006.01)
*A01D 43/063* (2006.01)
*B65B 1/26* (2006.01)
*B65B 61/24* (2006.01)
*A01G 20/43* (2018.01)
*A01G 20/47* (2018.01)

(56) References Cited

U.S. PATENT DOCUMENTS

| | | | |
|---|---|---|---|
| 4,443,997 A | 4/1984 | Namdari | |
| 5,057,127 A | 10/1991 | Lange et al. | |
| 5,263,520 A | 11/1993 | Arai | |
| 5,305,495 A * | 4/1994 | Nelsen et al. | A47L 7/0085 15/347 |
| 5,375,293 A | 12/1994 | Gilbertson | |
| 5,491,957 A | 2/1996 | Maskell | |
| 5,873,217 A | 2/1999 | Smith | |
| 6,644,361 B2 | 11/2003 | Otsubo | |
| 8,573,265 B1 | 11/2013 | Manninen | |
| 9,688,429 B2 * | 6/2017 | Luckau | B65B 31/042 |
| 2004/0112458 A1 | 6/2004 | Brown | |
| 2006/0177158 A1 | 8/2006 | Scholtis et al. | |
| 2006/0260280 A1 | 11/2006 | Jones | |
| 2010/0107579 A1 | 5/2010 | Meyer | |

FOREIGN PATENT DOCUMENTS

| | | |
|---|---|---|
| DE | 102011001808 A1 | 10/2012 |
| FR | 2154378 A1 | 5/1973 |
| GB | 266012 | 6/1927 |

OTHER PUBLICATIONS

EPO machine translation of DE 102011001808, retrieved Aug. 18, 2016, 19 pages.

* cited by examiner

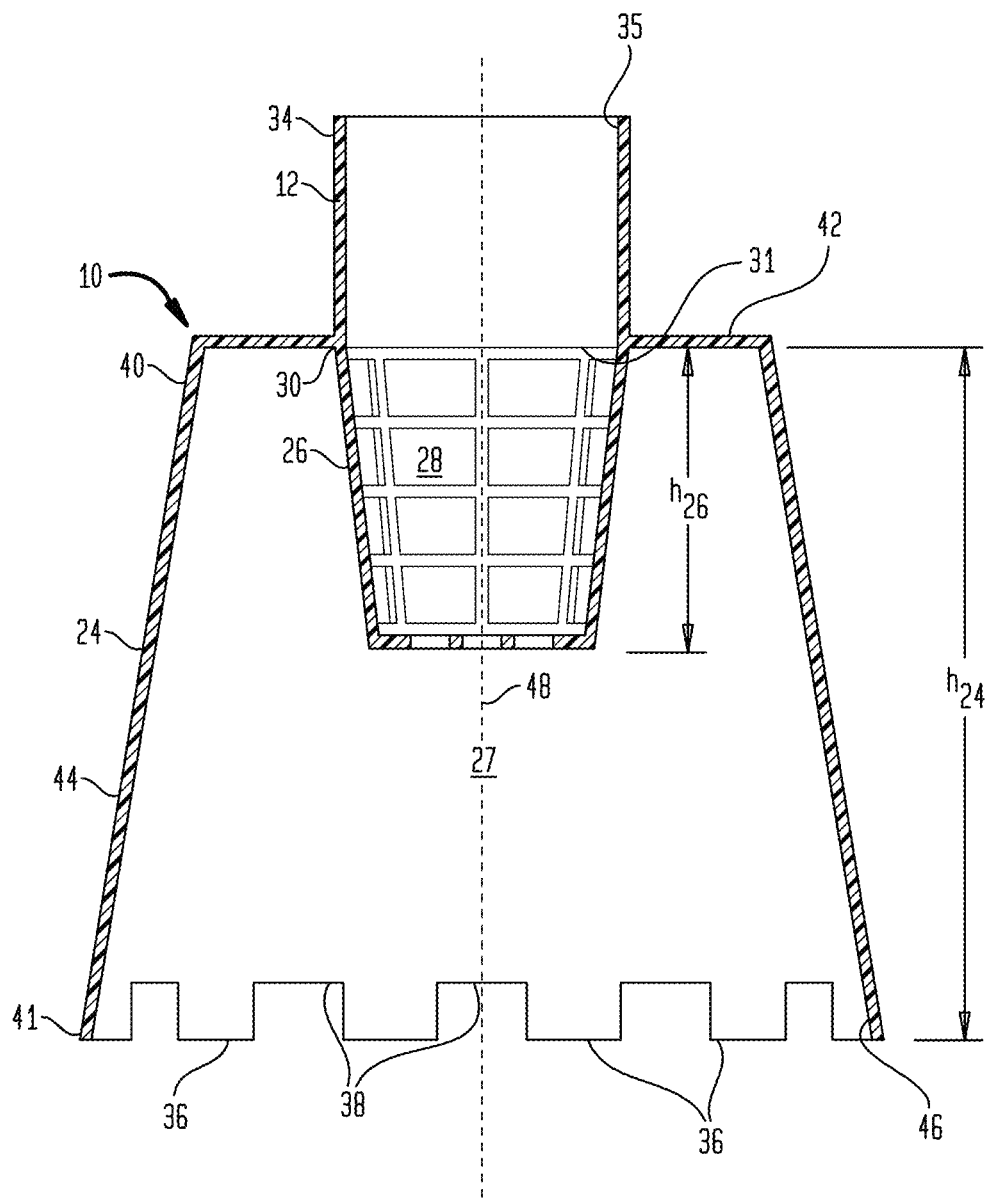

LEAF BAG COMPRESSING ADAPTER DEVICE AND METHOD OF USING

BACKGROUND

Technical Field of the Invention

The present invention is related to yard waste handling equipment and more specifically devices for compressing bags of leaves and other yard waste.

State of the Prior Art

Many homeowners and professional yard care workers rake or otherwise gather fallen leaves in the fall and put them in plastic bags for disposal. Fallen leaves are typically somewhat crisp and curled or otherwise irregular or non-planar in shape. Therefore, fallen leaves take up significant space in bags along with a substantial amount of air between the leaves. People often try to compact the leaves to get more leaves in each bag or so that the bags of leaves take less space. Such compacting efforts are often quite primitive, including packing leaves into the bags with hands or feet or squeezing or stepping on the bags.

The foregoing examples of the related art and limitations related therewith are intended to be illustrative and not exclusive. Other limitations of the related art and other examples of related art will become apparent to those of skill in the art upon a reading of the specification and a study of the drawings.

SUMMARY

The following embodiments and aspects thereof are described and illustrated in conjunction with systems, tools and methods which are meant to be examples and illustrative, not limiting in scope. In various embodiments and implementations, one or more of the above-described problems have been reduced or eliminated, while other embodiments are directed to other improvements and benefits.

An adapter device for adapting a suction end of a vacuum hose of a vacuum cleaner for suctioning air out of plastic bags of a type typically used for containing fallen leaves and other yard waste for disposal comprises a screen formed in a manner that surrounds a space that is connectable in fluid flow relation with the suction end of the vacuum hose, wherein the screen and the space surrounded by the screen extends along a longitudinal axis for a screened length; a shield positioned around the screen a radially spaced distance outwardly from the screen and having a length that extends a distance longitudinally beyond the screen to form a shield mouth, the shield being structured in a manner that is capable of preventing a plastic bag from being sucked by vacuum to the screen and the mouth being sized in a manner that is capable of blocking leaves or other yard waste matted in the bag from being sucked to the screen while allowing air in the bag to flow to the screen.

In addition to the example aspects, embodiments, and implementations described above, further aspects, embodiments, and implementations will become apparent to persons skilled in the art after becoming familiar with the drawings and study of the following descriptions.

BRIEF DESCRIPTION OF THE DRAWINGS

The accompanying drawings, which are incorporated herein and form a part of the specification, illustrate some, but not the only or exclusive, example embodiments and/or features of or relating to leaf bag compressing adapter devices. It is intended that the embodiments and figures disclosed herein are to be considered illustrative rather than limiting. In the drawings:

FIG. 11 is a cross-section view of another example leaf bag compressing adapter device similar to FIG. 9, but with a frustoconical shield.

DETAILED DESCRIPTIONS OF EXAMPLE EMBODIMENTS

Figure 1:
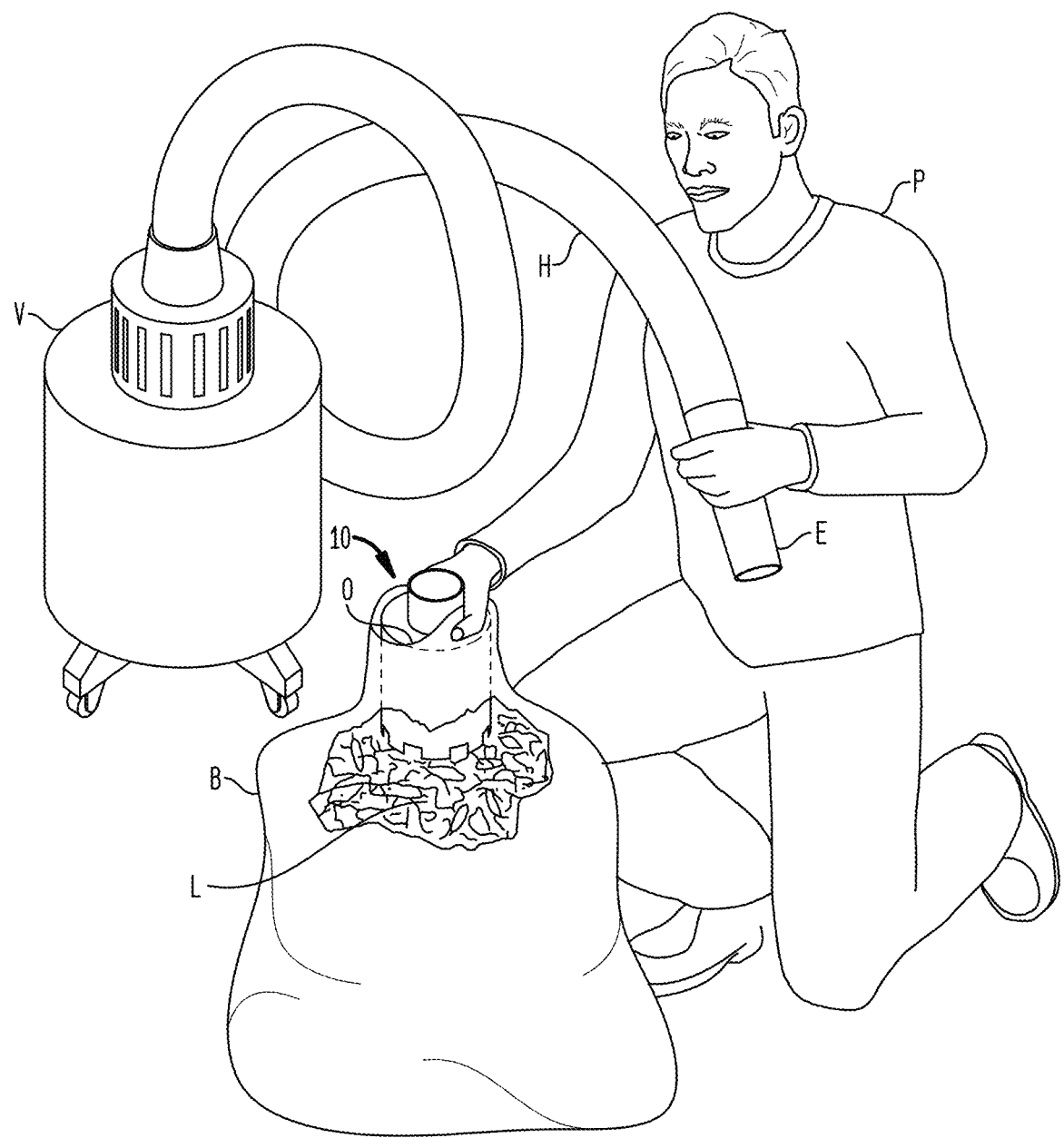
FIG. 1 is a perspective view of an example leaf compressing adapter device being held in a bag of leaves in preparation for connection of the device to a vacuum cleaner hose to compress the bag of leaves, a portion of the bag being cut away to reveal the leaves and example leaf compressing adapter device in the bag.

An example compressing adapter device 10 is illustrated in FIG. 1 as the compressing adapter device 10 is being held by a person P in an opening O of a bag B containing leaves L in preparation for connection of the compressing adapter device 10 to a suction end E of a vacuum hose H of a vacuum cleaner V for compressing the bag B and the leaves L in the bag B. The compressing adapter device 10 in this illustration is being applied to compressing leaves L in the bag B, but it can also be used for compressing other kinds of waste materials, for example, grass clippings, shredded paper, and other waste materials of a type that are low in density and typically placed in plastic bags for disposal. Therefore, while the description of the example compressing adapter device 10 and of its example application is being provided in relation to leaves L for convenience, it should be understood that it is also applicable to other kinds of low density waste materials that are typically bagged in plastic bags for transport or disposal.

Referring now primarily to FIGS. 1-4, the compressing adapter device 10 is designed for use in compressing a low-density waste, e.g., leaves L, in a bag B, for example, by positioning the compressing adapter device 10 in an opening O of the bag B, connecting a suction tube 12 of the compressing adapter device 10 to suction end E of a vacuum hose H of a vacuum creating apparatus V, and, tightening the opening O of the bag B around the compressing adapter device 10, and suctioning the air out of the bag B. The vacuum creating apparatus V can be a conventional shop or house vacuum cleaner, a commercial yard waste vacuum apparatus, or any device that creates a sufficient vacuum with a sufficient mass flow rate to evacuate the air from the bag B and thereby compress the leaves L in the bag to a desired density for disposal in a conveniently short time, for example, in a range of two to ten seconds. For convenience, the vacuum creating device V is sometimes called a vacuum cleaner V, but with the understanding that it is not limited to a vacuum cleaner. Of course, the compressing adapter device 10 can be connected to the vacuum hose H before the compressing adapter device 10 is placed into the opening O of the bag B, so the order of the steps in applying the compressing adapter device 10 should not be viewed as limiting or limited. A person P can apply the steps and operate the device in any order that is convenient.

Figure 2:
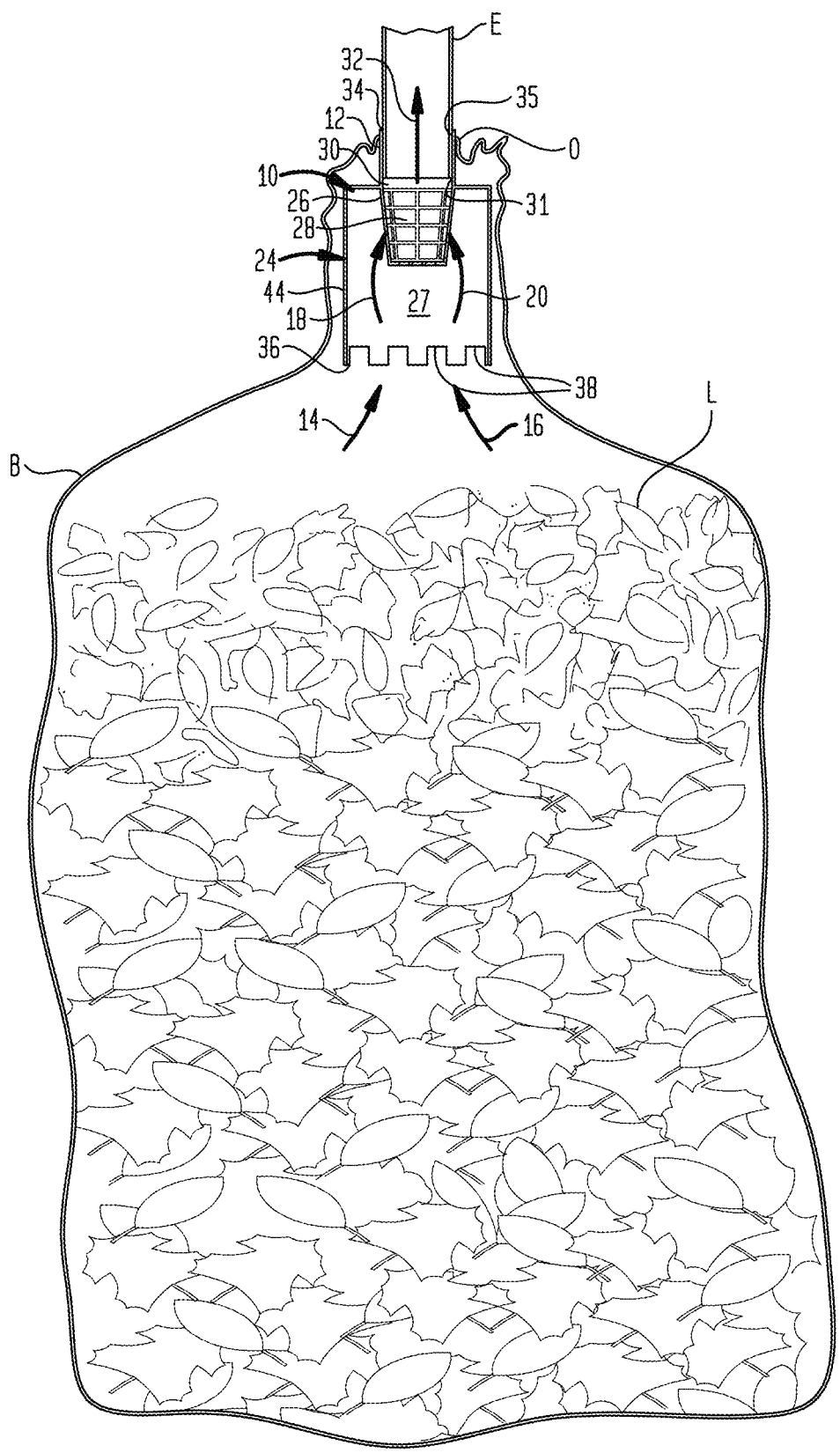
FIG. 2 is an enlarged cross-section view of the example leaf bag compressing adapter device in the bag of leaves before compression is begun.

As best seen in FIG. 2 in combination with FIG. 1, the example compressing adapter device 10 is shown positioned in the opening O of the bag B which is filled with leaves L. The bag B at the opening O can be gathered and held around the periphery of the compressing adapter device 10 illustrated in FIG. 1 or retained in that position in any other convenient manner. The suction tube 12 of the compressing adapter device 10 is connected to the suction end E of the vacuum hose H as shown in FIG. 2. This connection can be made in any convenient manner, for example, by inserting the section end E of the vacuum hose H into the suction tube 12 of the compressing adapter device 10, which is a conventional manner of attaching vacuum cleaner accessories to vacuum hoses of shop and house vacuum cleaners. When the vacuum creating device V (FIG. 1) is operating, it creates a vacuum that sucks air from the inside of the bag B as illustrated by the air flow arrows 14, 16 in FIG. 2, through the bottom opening or mouth 46 of the compressing adapter device 10 as illustrated by the air flow arrows 18, 20, and through the suction end E of the vacuum hose H (FIG. 1). The bag B can be a conventional plastic trash bag or any bag that is impervious or at least somewhat impervious to air so that, as the air is sucked out of the bag B, air pressure inside the bag B decreases, whereby the atmospheric pressure outside of the bag B presses inwardly on the bag B as illustrated by the atmospheric pressure arrows 22 in FIG. 3 to compress the leaves L as the bag B collapses.

The distal end 30 of the suction tube 12 defines an inlet opening 31 for the suction tube 12, and the proximal end 34 defines an outlet opening 35 for the suction tube 12. An inlet screen 26 surrounds a space 28, sometimes called an inlet zone, adjacent to the inlet opening 31. A shield 24 keeps the bag B away from an inlet screen 26 and provides a channel 27 that facilitates air flow from the bag B toward distal end 30 of the suction tube 12 as illustrated by the air flow arrows 18, 20. The example cylindrical shield 24 in FIGS. 1-4 is shown as cylindrical in shape, although other shapes could be used. The example cylindrical shield 24 has a significantly larger diameter than the suction tube 12 so that the air flow 18, 20 through the cylindrical shield 24 is significantly slower than the air flow 32 into and through the suction tube 12. The slower air flow 18, 20 in the cylindrical shield 24 minimizes likelihood that leaves L in the bag B will be sucked by the air flow 18, 20 toward the inlet opening 31 of the suction tube 12. However, in the event a few of the leaves L do get sucked by the air flow 14, 16 or 18, 20 toward the inlet opening 31, the inlet screen 26 is provided to intercept and stop at least larger leaves L, as illustrated the leaves L1 and L2 in FIGS. 3 and 4, before they reach the inlet opening 31. A few smaller leaves (not shown) may pass through the suction tube 12 and vacuum hose H without clogging, so the screen 26 can be made with openings of sizes that would allow smaller leaves to pass through the screen to the inlet opening 31 and get sucked into the vacuum cleaner without clogging the inlet opening 31, suction tube 12, or vacuum hose H, which would also minimize likelihood of the screen 26 becoming clogged with such smaller leaves.

Figure 3:
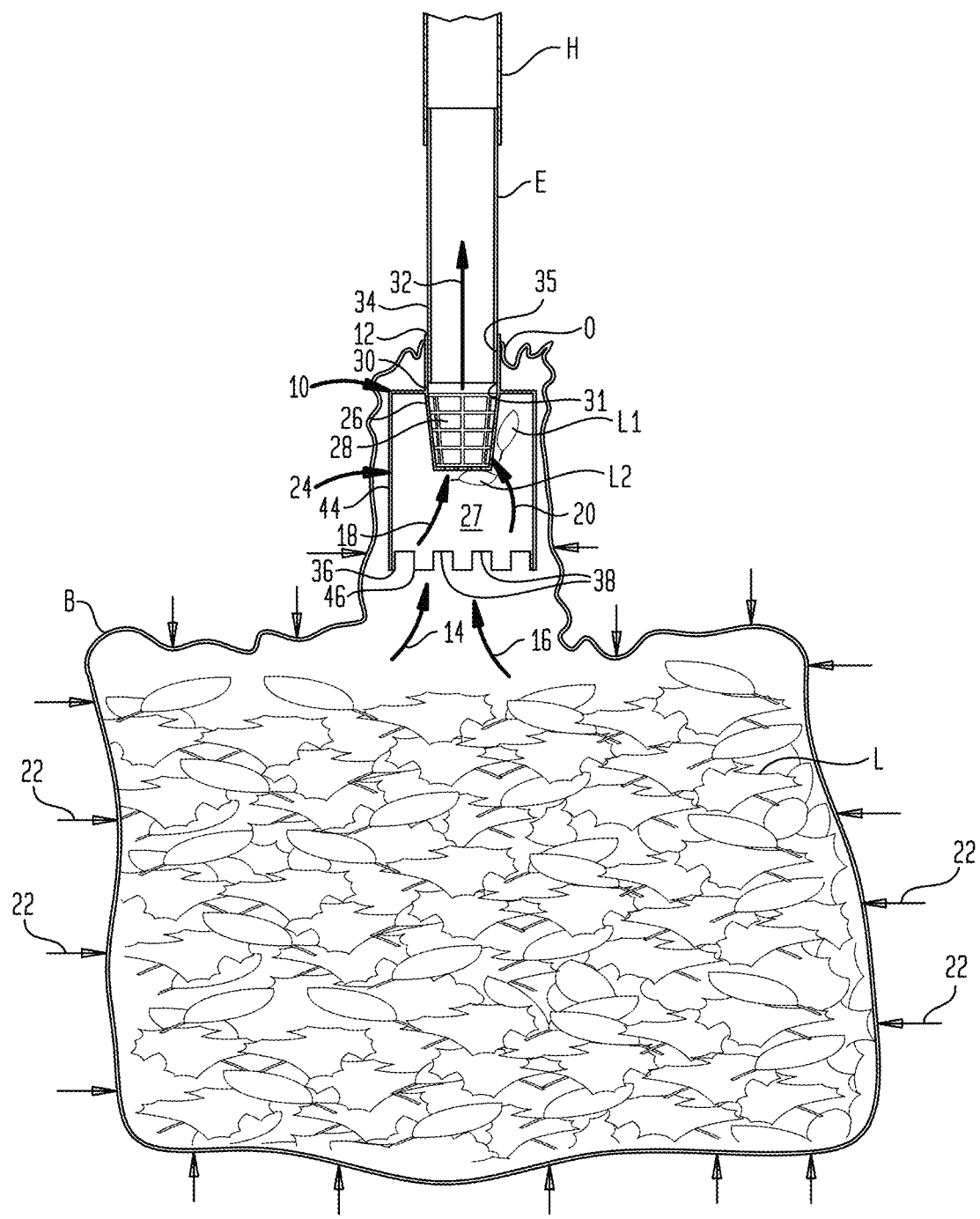
FIG. 3 is an enlarged cross-section view of the example leaf bag compressing adapter device in the bag of leaves similar to FIG. 2, but illustrating the bag of leaves partially compressed.
Figure 4:
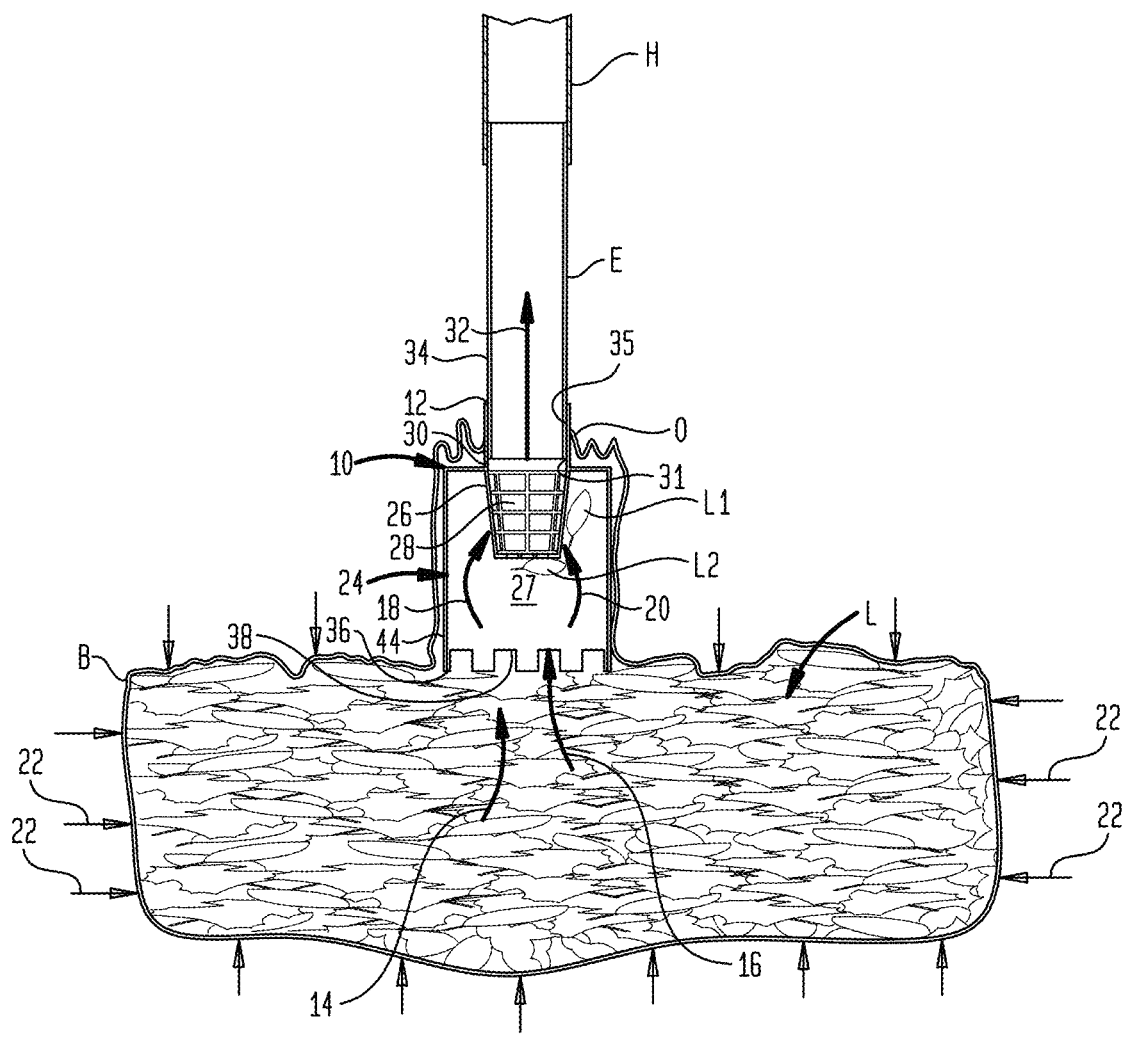
FIG. 4 is an enlarged cross-section view of the example leaf bag compressing adapter device in the bag of leaves similar to FIGS. 2 and 3, but illustrating the bag of leaves fully compressed.
Figure 5:
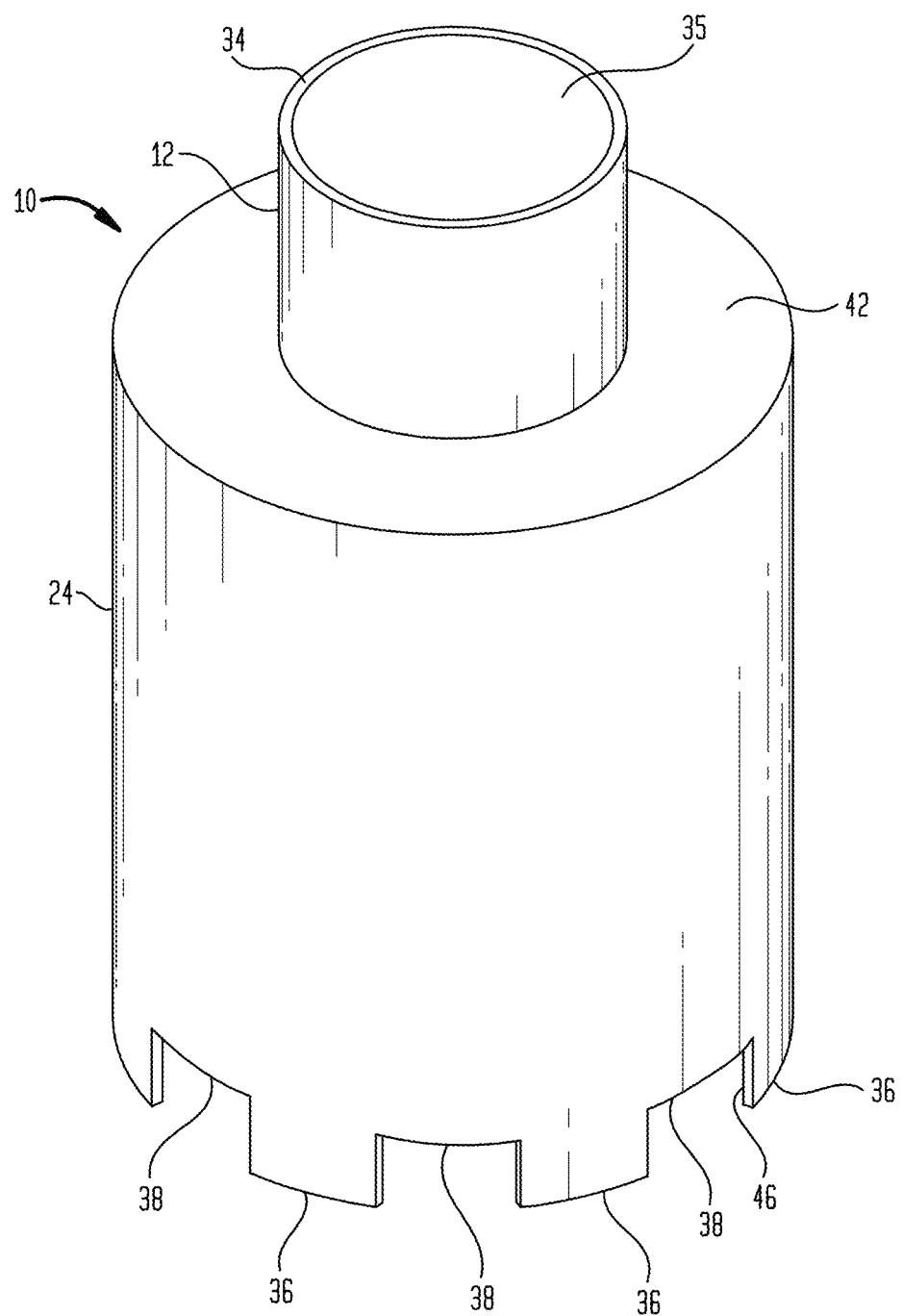
FIG. 5 is an enlarged isometric view of the example leaf bag compressing adapter device in FIGS. 1-4.
Figure 6:
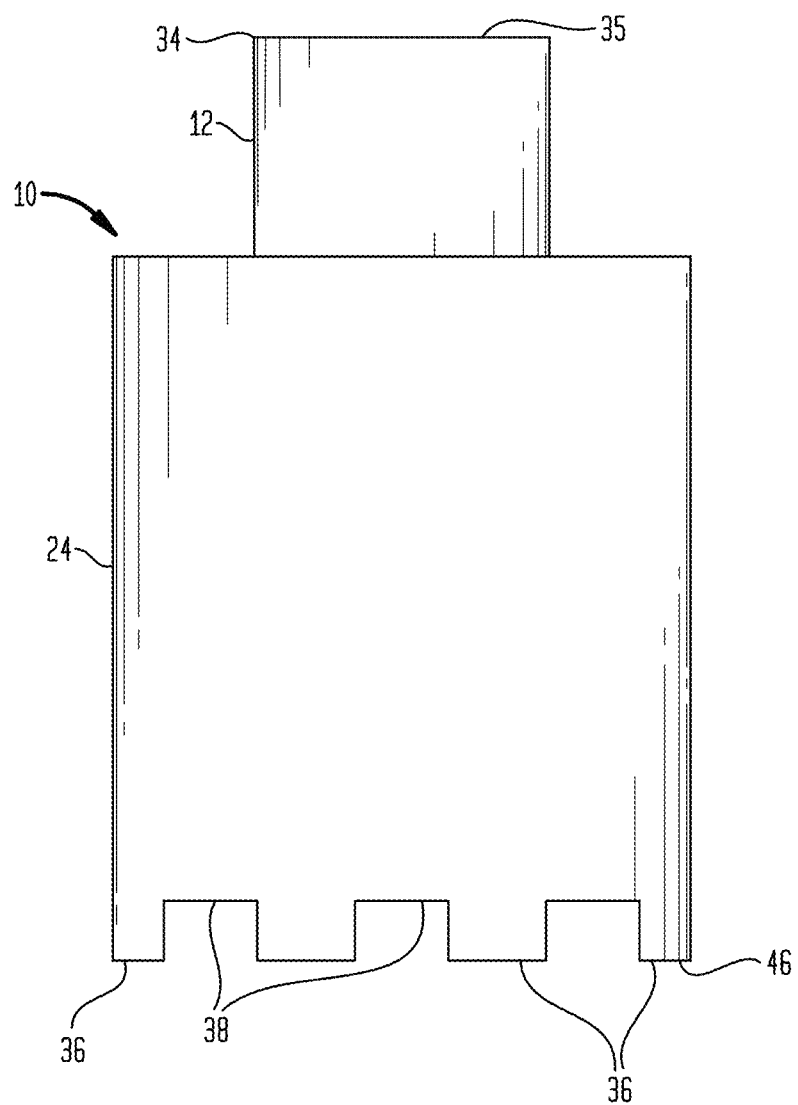
FIG. 6 is a side elevation view of the example leaf compressing adapter device in FIG. 5.
Figure 7:
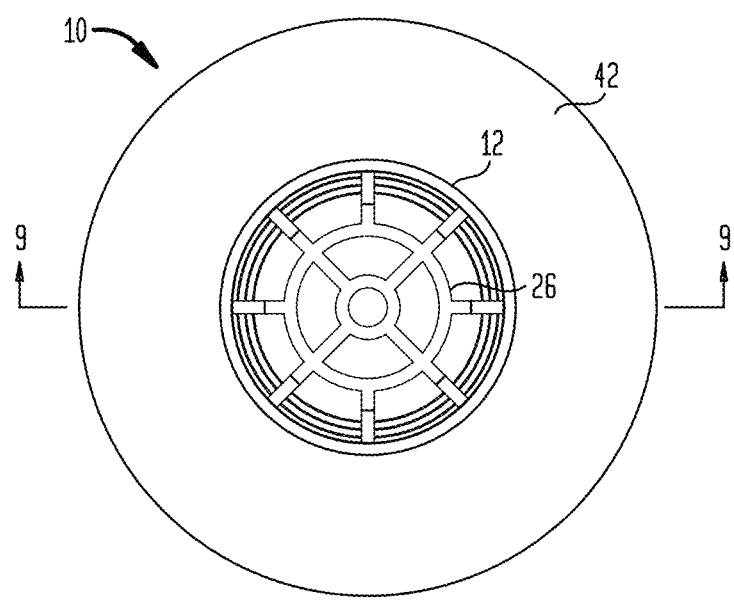
FIG. 7 is a top plan view of the example leaf compressing adapter device in FIG. 5.
Figure 8:
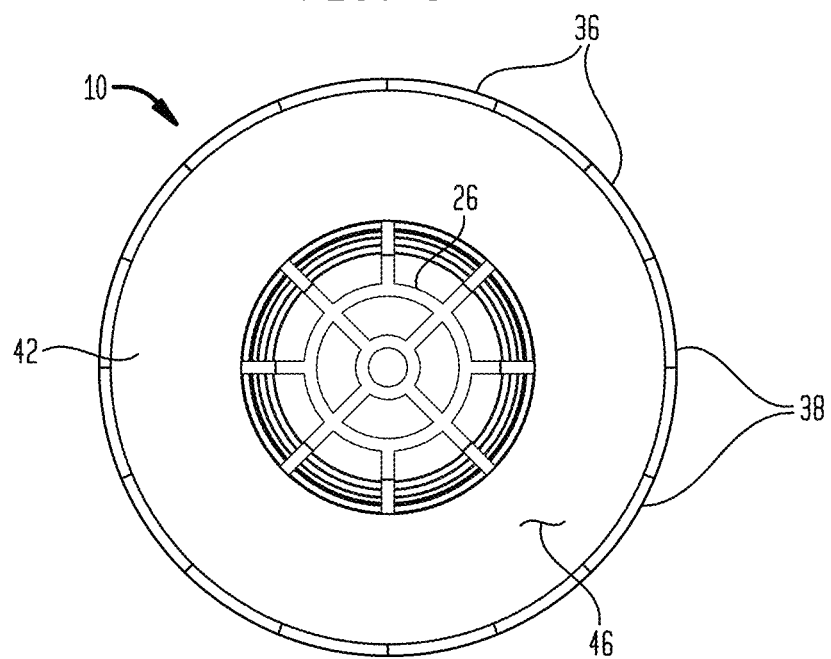
FIG. 8 is a bottom plan view of the example leaf compressing adapter device in FIG. 5.
Figure 9:
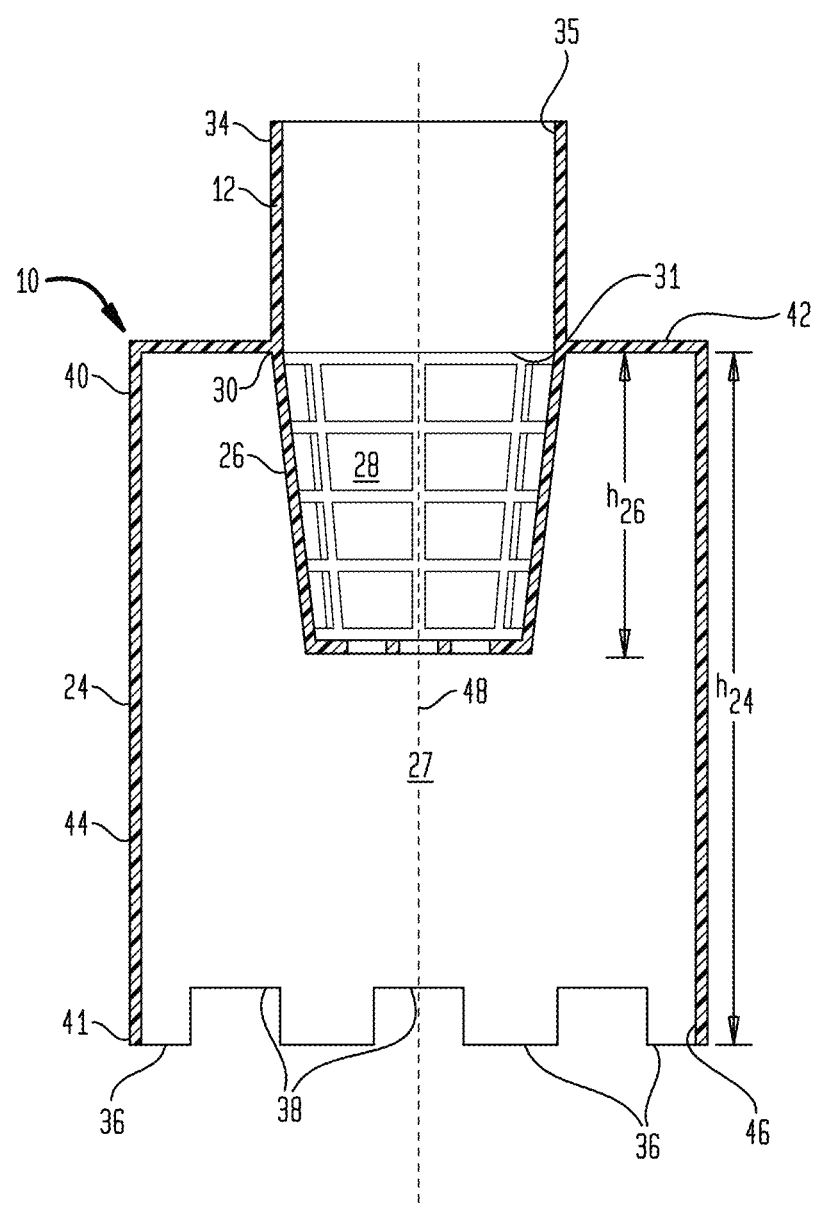
FIG. 9 is cross-section view of the example leaf compressing adapter device taken along section line 9-9 in FIG. 7.

As the bag B is compressed by the atmospheric pressure 22 as explained above, the interior volume of the bag B is decreased as illustrated in FIGS. 3 and 4. As the interior volume of the bag B is decreased, the bottom rim 36 of the shield 24 that forms the bottom opening or mouth 46 may come in contact with the compressed leaves L in the bag B as illustrated in FIG. 4. While not essential to effective operation of the compacting device 10, a notched, serrated, undulating, or other irregular shaped rim 36 contacting the compressed leaves can enhance the flow of air 14, 16 out of the compressed leaves L. In the example compressing adapter device 10 in FIGS. 1-4, the bottom rim 36 is shown as notched, so that air emerging from leaves L in the vicinity of the rim 36 can flow through the notches 38, even if the leaves 36 are pressed tight against the lower extremities of the rim 36 as illustrated in FIG. 4.

When the air pressure inside the bag B is lowered as much as the vacuum creating device V has the capacity or ability to lower the pressure, the bag B can be considered as fully collapsed and leaves L can be considered to be fully compressed, as illustrated, for example, in FIG. 4. Essentially, the combination of the resistance of the leaves L in the bag B to further compaction and the pressure of the remaining air in the bag reaches an equilibrium with the atmospheric pressure on the outside of the bag B. At that point, further compaction of the leaves L is unattainable with that particular vacuum creating device V, so the compressing adapter device 10 can be removed from the bag B. Of course, a user could decide to stop the compaction before leaves L are fully compacted by removing the compressing adapter device 10 from the bag B, stopping the vacuum creating device B, or both.

As best seen in FIGS. 5-9, the example compressing adapter device 10 has a suction tube 12 with a proximal end 34 that is sized and shaped for attachment to a vacuum hose H (FIGS. 1-4), for example, by snuggly receiving a suction (distal) end of the vacuum hose H as explained above. Therefore, the diameter of the suction tube 12 in the example compressing adapter device 10 is about the same as the diameter of the vacuum hose H of the vacuum creating device V with which the compressing adapter device 12 is being operated—perhaps slightly larger or slightly smaller, depending on whether the proximal end 34 of the suction tube is sized to be inserted into the suction end E of the vacuum hose H or to receive the suction end E of the vacuum hose H into the proximal end 34 of the suction tube 12. In one example embodiment, the suction tube 12 has an inside diameter in a range of 1.5 to 3.0 inches (38 to 76 mm), for example, 2.33 inches (59 mm), and a length in a range of 1.5 to 3.0 inches (38 to 76 mm), for example, 2 inches (51 mm). The suction tube 12 could be slightly tapered (e.g., wider at the proximal end 34 and narrowing slightly toward the distal end 30) for a snug fit with a suction end E of a vacuum hose H.

The distal end 30 of the suction tube 12 terminates at an elongated inlet screen 26. The example inlet screen 26 is in the shape of a figure of revolution that surrounds a space 28 adjacent to the inlet opening 31 of the suction tube 12. For example, the inlet screen 26 in FIGS. 5-9 is a frustoconical shape, although a conical, cylindrical, spherical, pyramid, rectangular prism, or other solid geometric shape could be used for the inlet screen 26. The example frustoconical-shaped screen 26 may be, for example, in a range of 1.5 to 3 inches (38 to 76 mm) in diameter and 1.5 to 3.5 inches (38 to 90 mm) long. The inlet screen 26 has openings around its circumference and distal end, with the openings being 50 to 90 percent of the total area of the circumference and distal end.

The example shield 24 has a peripheral wall 44 that is connected at its proximal end 24 to the suction tube 12 by an end plate 42 and extends to the rim 36 at its distal end 41. The rim 36 forms the bottom opening or mouth 46 of the shield 24. The example shield 24 is cylindrical in shape, but it could be frustoconical, conical, spherical, pyramid, rectangular prism, or other solid geometric shape. The shield 24 has an inside diameter or width that is significantly greater than the inside diameter of the suction tube 12 so that the velocity of air flow in the shield 24 is significantly less than the velocity of air flow in the suction tube 12. In one example embodiment, the inside diameter of the shield 24 is in a range of 1.5 to 3.5 times greater than the inside diameter of the suction tube 12. In one example embodiment the cross-sectional area of the shield 24 is in a range of 2 to 14 times larger than the cross-sectional area of the suction tube 12. In one example embodiment, the length of the shield 24 is in a range of 2 to 3 times the inside diameter of the suction tube 12.

The inlet screen 26 extends from the inlet opening 31 of the suction tube 12 along a longitudinal axis 48 toward, but not all the way to, the mouth 46 at the distal end 41 of the shield 24 so that the rim 36 at the distal end 41 of the shield 26 can hold the leaves L in the bag B away from the inlet screen 26. In one example embodiment, the length $h_{26}$ of the inlet screen 26 is one-third to two-thirds the length $h_{24}$ of the shield 24. In one example embodiment, the inlet screen 26 extends from the inlet opening 31 a distance along the longitudinal axis 48 in a range of one-third to two-thirds of the inside length $h_{24}$ of the shield 24 toward the mouth 46 at the distal end 41 of the shield 24. In one example embodiment, the inlet screen 26 extends from the inlet opening 31 a distance along the longitudinal axis 48 of not more than one-half the length $h_{24}$ of the shield 24 toward the mouth 46 at the distal end of the shield 24.

In use, as explained above and shown in FIGS. 1-4, the wall 44 of the shield 24 holds the bag B away from the inlet screen 26 and provides a channel 27 for the flow of air 18, 20 from the interior of the bag B to the inlet opening 31 of the suction tube 12. The rim 36 at the distal end 41 of the shield 24 keeps a distance between the leaves L in the bag B and the inlet opening 31 and holds the leaves L in the bag B from reaching the inlet opening 31 so that the leaves L cannot clog the inlet opening 31. The cross-sectional area of the flow channel 27 in the shield 24 is larger than the cross-sectional area of the inlet opening 31, so the air flow 18, 20 in the channel 27 is slower than the air flow into the inlet opening 31, which reduces the likelihood that leaves L get sucked from the bag B into the channel 27 and to the inlet screen 26. The inlet screen 26 stops leaves, for example leaves L1 and L2 in FIGS. 3 and 4, that do get sucked into the channel 27 from reaching the inlet opening 31. As the air is sucked out of the bag B through the compressing adapter device 10, the atmospheric pressure outside of the bag b collapses the bag b and compresses and compacts the leaves L in the bag B, as described above and illustrated in FIGS. 3 and 4.

Figure 10:
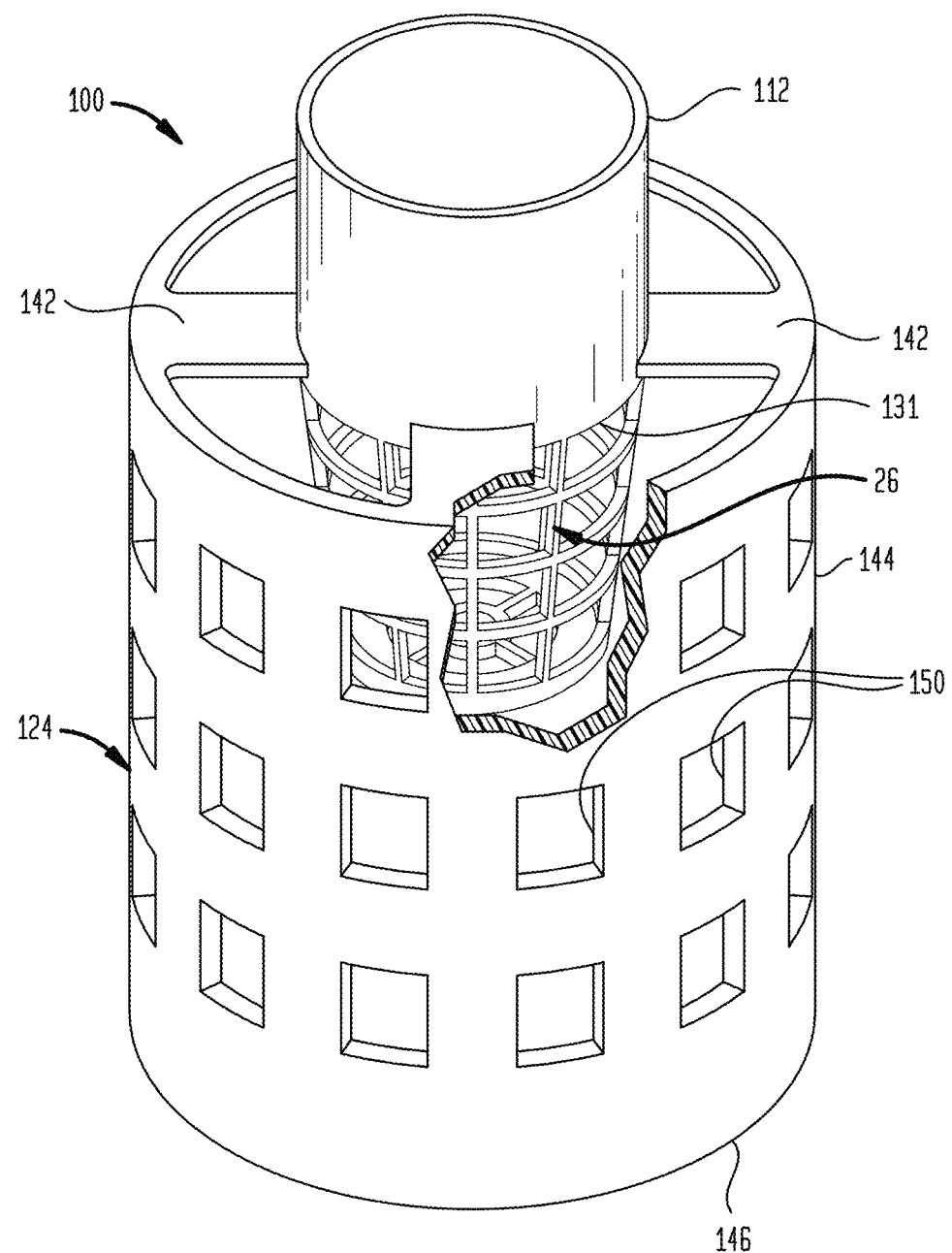
FIG. 10 is an isometric view of another example compressing adapter device embodiment with a portion of the shield cut away to reveal the inlet screen.

Another example compressing adapter device embodiment 100 is shown in FIG. 10. The suction tube 112 and inlet screen 126 of the example compressing adapter device 100 are substantially the same as the suction tube 12 and inlet screen 26 of the compressing adapter device 10 described above and shown in FIGS. 5-9. However, the shield 124 of the example compressing adapter device 100 has openings 150 through the peripheral wall 144 of the shield 124 instead of the solid wall 44 of the shield 24 in the example compressing adapter device 10 described above. Also, the shield 124 of the example compressing adapter device 100 is connected to the suction tube 112 by spokes 142 instead of the solid end wall 42 of the compressing adapter device 10 described above. The bag B (not shown in FIG. 10, but essentially the same as the bag B in FIGS. 1-4) can still be gathered and sealed around the suction tube 112 to prevent air flow from outside the bag B to the inlet opening 131 of the suction tube 112, while the openings 150 in the wall 144 of the shield 124 facilitate air flow from the interior of the bag B through the shield 124 to the inlet opening 131, at least in the initial stages of sucking the air out of the bag B. As the air is sucked out of the interior of the bag B, atmospheric pressure outside of the bag B eventually collapses the bag B against the wall 44 of the shield 124, which closes the openings 150 to the flow of air, but the air from the interior of the bag B can still flow through the bottom opening or mouth 146 of the shield 124 and through the interior channel defined by the wall 144 of the shield 124 the same as described for the air flow through the channel 27 of the compressing adapter device 10 above.

The foregoing description provides examples that illustrate the principles of the invention, which is defined by the features that follow. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the features. The words "comprise," "comprises," "comprising," "include," "including," and "includes" when used in this specification, including the features, are intended to specify the presence of stated features, integers, components, or steps, but they do not preclude the presence or addition of one or more other features, integers, components, steps, or groups thereof.

The invention and several embodiments in which an exclusive property or privilege is claimed are defined as follows:

1. An adapter device for adapting a suction end of a vacuum hose of a vacuum cleaner for suctioning air out of plastic bags containing fallen leaves and other yard waste for disposal, comprising:

a suction tube that has an inside diameter and an inlet end and an outlet end, the outlet end having a size and shape that is connectable to the suction end of the vacuum hose;

a screen attached in fluid-flow relation to the inlet end of the suction tube with an opening into the suction tube and formed with a circumferential periphery and a distal end that surround a space adjacent to the inlet end of the suction tube, which space is in fluid-flow communication with the suction tube through the opening of the screen into the suction tube, wherein the screen and the space surrounded by the screen extends along a longitudinal axis for a screened length; and a shield comprising a proximal end, which is attached to the suction tube, and a peripheral wall positioned around the screen a radially spaced distance outwardly from the screen and having a length that extends a distance longitudinally beyond the screen to a rim that forms a shield mouth at a distal end of the shield such that the shield forms a channel for conducting an air flow from the mouth to the suction tube, the shield being structured in a manner that is capable of preventing a plastic bag from being sucked by vacuum to the screen and the rim being sized in a manner that is capable of blocking leaves or other yard waste matted in the bag from entering the channel and being sucked to the screen while air in the bag, including air emerging from the leaves in the vicinity of the rim that are pressed tight against the rim, flows into the channel and to the screen, wherein the screen extends from the inlet opening a distance in a range of one-third to two-thirds of the inside length of the shield toward the rim at the distal end of the shield, and wherein the length of the shield is in a range of 2 to 3 times the opening of the screen into the suction tube, and wherein the shield has an inside diameter in a range of 1.5 to 3.5 times greater than the inside diameter of the suction tube to provide an air flow velocity reduced from an air flow velocity in the vacuum hose to avoid sucking the leaves in the bag to the screen while sucking air out of the bag.

2. The adapter device of claim 1, wherein the circumferential periphery and distal end of the screen have a total screen area, and openings in the screen comprise 50 to 90 percent of the total screen area.

3. The adapter device of claim 1, wherein the proximal end of the shield includes an end plate that is attached to the suction tube.

4. The adapter device of claim 3, wherein the rim has an irregular shape.

5. The adapter device of claim 3, wherein the rim has a notched shape.

6. The adapter device of claim 1, wherein the shield is a hollow cylinder in shape.

7. The adapter device of claim 1, wherein the shield is a hollow frustoconical shaped shield with a proximal end that is large enough in diameter to surround the screen and to attach to the suction tube and with a distal end that is larger in diameter than the proximal end.

8. The adapter device of claim 1, wherein the shield is impervious to air.

9. The adapter device of claim 1, wherein the shield has an inside diameter or width that is greater than the inside diameter of the suction tube, and the inlet screen is an extension of the suction tube and tapers from the inside diameter of the suction tube to an inside diameter at the distal end of the inlet screen that is smaller than the inside diameter of the suction tube.

10. A method of compressing leaves or other yard waste in a plastic bag, comprising:

connecting an adapter device for suctioning air out of the plastic bag to a vacuum creating device, wherein the adapter device comprises: (i) a suction tube that has an inlet end and an outlet end, the outlet end having a size and shape that is connectable to a suction end of a vacuum hose of the vacuum creating device; (ii) a screen attached in fluid-flow relation to the inlet end of the suction tube and formed with a circumferential periphery and a distal end that surround a space adjacent to the inlet end of the suction tube, wherein the screen and the space surrounded by the screen extends along a longitudinal axis for a screened length; and (iii) a shield comprising a proximal end, which is attached to the suction tube, and a peripheral wall positioned around the screen a radially spaced distance outwardly from the screen and having a length that extends a distance longitudinally beyond the screen to a rim that forms a shield mouth at the distal end of the shield such that the shield forms a channel for conducting air flow from the mouth to the suction tube, the shield being structured in a manner that is capable of preventing a plastic bag from being sucked by vacuum to the screen and the rim being sized in a manner that is capable of blocking the leaves or other yard waste matted in the bag from entering the channel and being sucked to the screen while air in the bag, including air emerging from the leaves in the vicinity of the rim that are pressed tight against the rim, to flow to the screen, wherein the inlet screen extends from the inlet opening a distance in a range of one-third to two-thirds of the inside length of the shield toward the rim at the distal end of the shield, and wherein the length of the shield is in a range of 2 to 3 times the inside diameter of the suction tube, and wherein the shield has an inside diameter in a range of 1.5 to 3.5 times greater than the inside diameter of the suction tube to provide an air flow velocity reduced from an air flow velocity in the vacuum hose to avoid sucking the leaves in the bag to the screen while sucking air out of the bag;

positioning the adapter device in an opening of the plastic bag and closing the opening of the plastic bag around the shield of the adapter device such that air from outside the plastic bag is inhibited from entering the plastic bag; and applying the vacuum creating device to suck air out of the plastic bag through the adapter device.

\* \* \* \* \*